May 20, 1941. F. C. MARX 2,242,531
CAN HANDLING APPARATUS
Filed Aug. 11, 1938 3 Sheets-Sheet 3
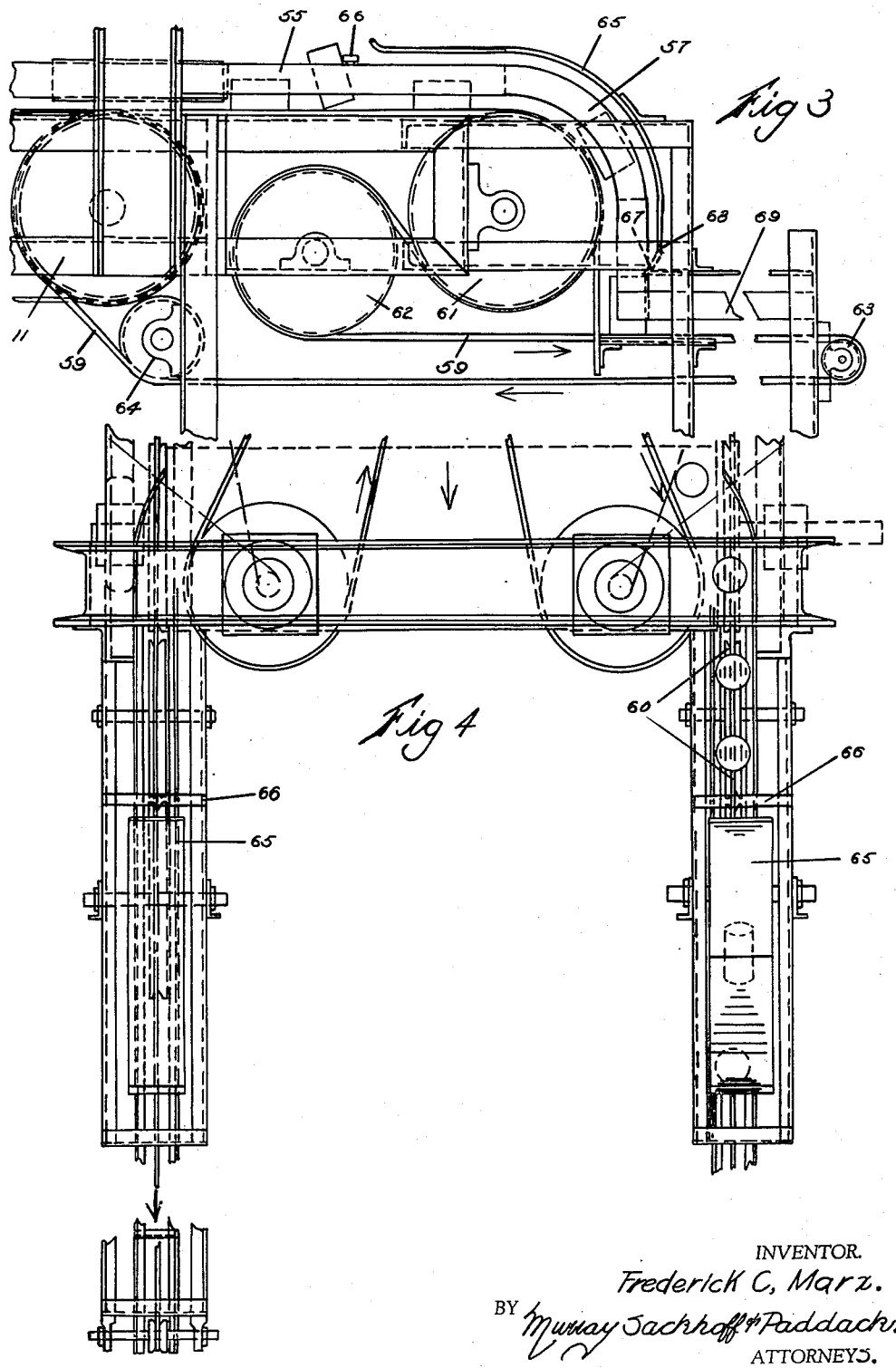
INVENTOR.
Frederick C. Marx.
BY Murray Sachhoff & Paddach.
ATTORNEYS.

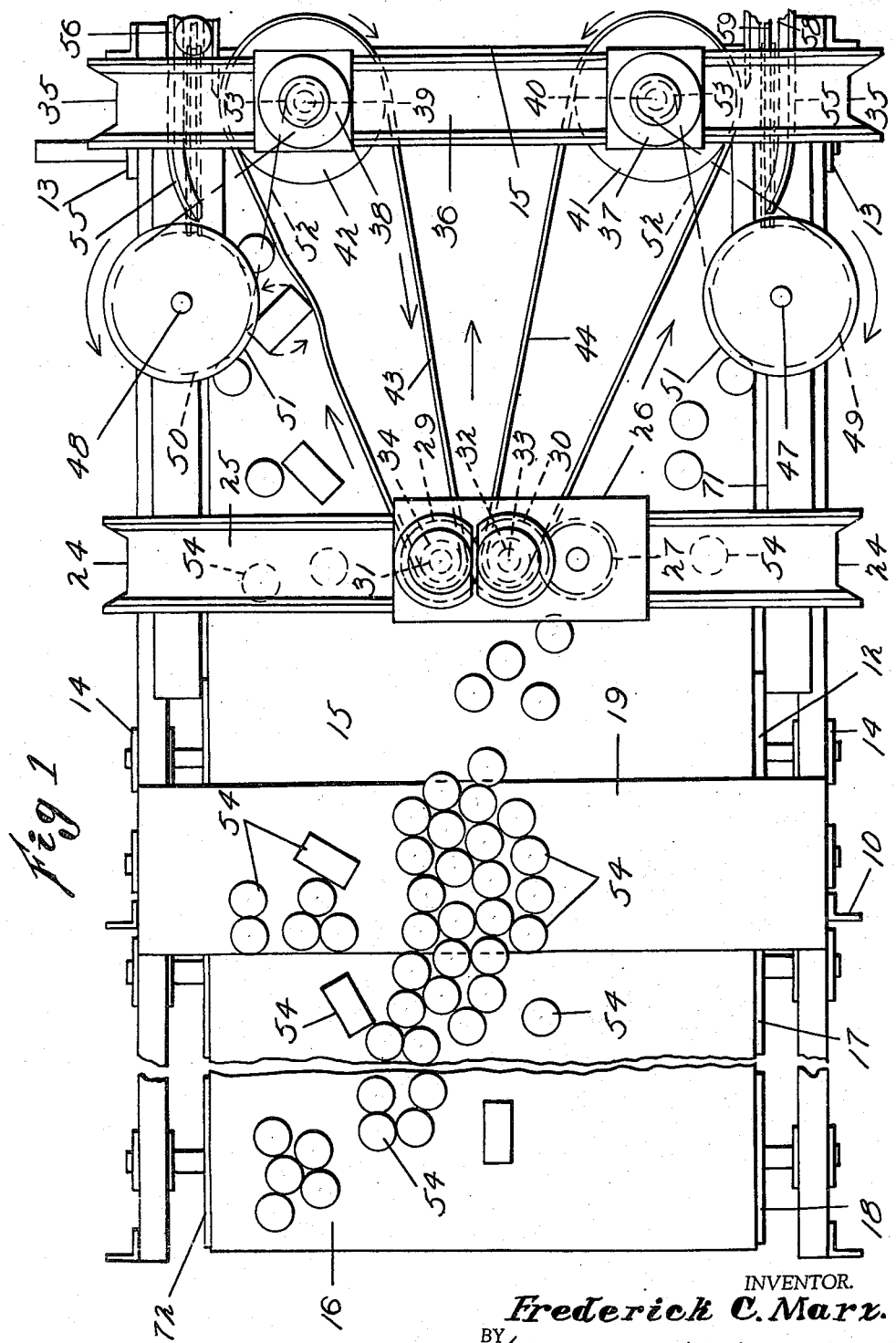

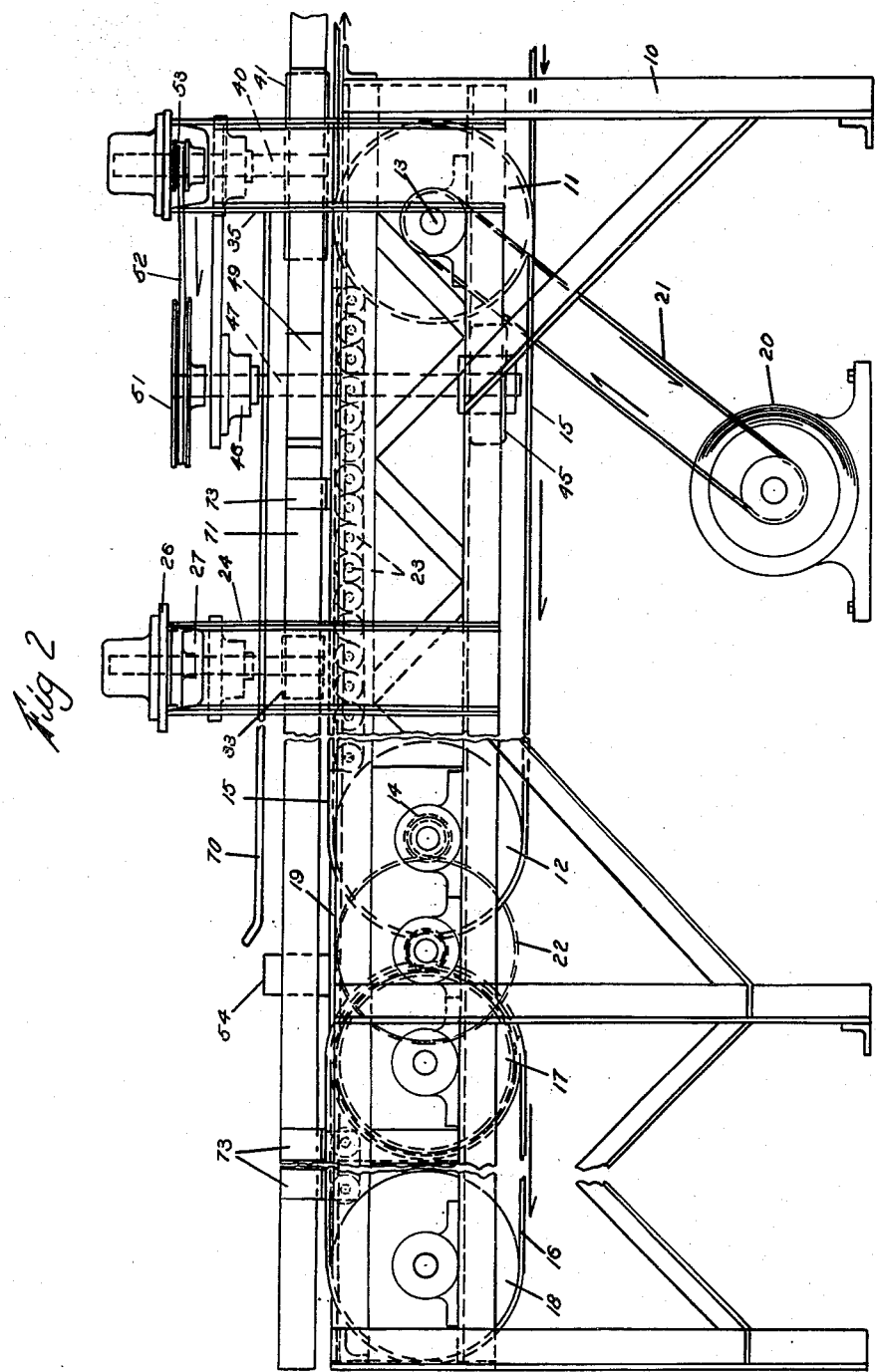

Patented May 20, 1941

2,242,531

UNITED STATES PATENT OFFICE 2,242,531

CAN HANDLING APPARATUS

Frederick C. Marx, Cincinnati, Ohio, assignor to The Heekin Can Company, Norwood, Ohio, a corporation of Ohio Application August 11, 1938, Serial No. 224,315

3 Claims. (Cl. 198—30)

This invention relates to mechanism for handling a plurality of objects of generally similar shape and for transferring and arranging such articles in definite formation, after the articles have been delivered or deposited upon the mechanism unarranged.

An object of the invention is to provide means of the character described particularly adapted for use in arranging a plurality of cans into single line upright formation.

Another object is to provide such a mechanism in which the cans or articles to be arranged may be delivered to the mechanism in an entirely unarranged condition, and regardless of whether the articles are standing upright or lying on their sides when so deposited or delivered.

Another object is to provide a mechanism having means for arranging a plurality of moving objects into single line formation, means being provided for precluding jamming or improper concentration of the articles during the operation of forming a single line of the objects.

Another object is to provide, in connection with mechanism of the character indicated, a novel means and method of converting cans or similar objects from a horizontal to an upright position during the process of carrying the objects forward.

Another object is to effect the operations and functions above mentioned by mechanism of relatively simple construction and adapted for considerable modification so that objects or articles of different sizes may be handled by a single unit.

These and other objects are attained by the means described herein and illustrated in the accompanying drawings, in which:

Fig. 1 is a plan view, with parts broken away, of the mechanism of this invention for receiving a plurality of unarranged objects and for transferring and arranging the objects into single lines.

Fig. 2 is a side elevational view of the structure seen in Fig. 1.

Fig. 3 is a side elevational view, with parts broken away, of the mechanism of this invention for delivering a line of cans or other objects all disposed in an upright position, the directly connected parts of the mechanism seen in Figs. 1 and 2, being shown.

Fig. 4 is a plan view of the structure seen in Fig. 3.

It has been attempted heretofore to provide mechanism for handling a plurality of objects and converting them from an unarranged to a predetermined position or relationship. This problem is one of particular interest in the canning industry where great numbers of cans must be arranged and handled in a minimum of time. The means heretofore ordinarily employed, where such means have not been almost entirely manual, have necessitated the initial handling of the cans in order to place them in an upright position. This operation in itself requires considerable manual labor with its accompanying limitations as to speed and efficiency. In the second place, where means have heretofore been provided for arranging the upright cans into some kind of linear formation, such means have entailed the disadvantage of jamming, that is, of causing two or more cans to become wedged between parts of the moving mechanism with probable injury both to the cans and to the mechanism itself. Finally, the mechanism heretofore employed for can handling and the like, has, for the most part, been cumbersome, involved and inefficient.

These and other disadvantages have been overcome by the means of the present invention which provides, briefly, for a horizontal carrier, such as a belt moving in one direction, and having mounted thereabove, a vertical belt extending diagonally of the horizontal belt and a wheel rotating likewise in the same general direction as the horizontal belt, the speed ratios of the several moving parts mentioned being such as to efficiently concentrate the cans and deliver them in single line formation without danger of jamming or wedging of the cans at any point. In addition, the invention comprises means receiving the single line of cans, which may be either upright or on their sides and for delivering such cans, all in upright position.

In greater detail and with reference to Figs. 1 and 2, the present invention may comprise a frame 10 adapted to have mounted thereon a pair of rollers 11 and 12 provided with suitable bearings 13 and 14. The rollers 11 and 12 are adapted to have mounted thereon a suitable carrier, such as the belt 15 which, as shown herein, is horizontally disposed.

The same frame 10, likewise carries a similar belt 16 mounted on similar rollers 17 and 18, this belt, or at least the upper reach or section, being preferably disposed in the same plane as the similar section of the belt 15. Overlapping the adjacent ends of the belts 15 and 16 is a plate 19, disposed in the same general plane as the belts.

The belt 15 is adapted to be moved in one direction and for this purpose there may be provided a motor 20 connected by a suitable belt or cable 21 with one of the rollers 11 or 12 (roller 11, as here shown) and imparting movement thereto. The movement is transmitted by the belt 15, through the roller 12 and likewise through suitable reduction gearing, indicated at 22, Fig. 2, to the roller 17, associated with the belt 16 for causing the belt 16 to move in the same direction, but at a lower rate of speed, than the belt 15. The ratio of speed between the two belts may be determined by specific needs but generally speaking, the belt 15 is preferably moved at a considerably greater rate, for example, at a ratio of ten to one, than the belt 16, for purposes which will later be described.

It will be seen in Fig. 2 that the upper reach of the belt 15, in the space between its rollers, may have disposed immediately therebeneath, a plurality of small rollers or cylinders 23 for rendering this section of the belt relatively non-yielding.

Above the belt 15 and extending diagonally thereof, is a vertical belt unit that is, a unit comprising belts disposed edgewise relative to the large horizontal belt 15. In the present instance, two vertical belts are shown as forming part of the mechanism. It is obvious that one vertical belt only might be utilized with a somewhat narrower horizontal belt of the type of 15. However, by the use of a broader belt 15, and a pair of the vertical belts and associated means, the capacity of the can mechanism may be greatly increased.

For positioning and operating the vertical belts, the machine frame 10 may have a pair of uprights 24 secured thereto and connected by a beam 25 which may have a platform member 26 secured thereto intermediate its ends. Supported by the platform 26 is a motor 27. The motor, through the medium of suitably housed gearing, indicated at 29 and 30, drives a pair of downwardly projecting shafts 31 and 32, Fig. 1. The lower ends of these shafts terminate above the belt 15 and have mounted thereon the rollers or belt pulleys 33 and 34.

Adjacent the outer end of the belt 15, the frame 10 is provided with a second pair of uprights 35 having a transverse beam 36 extending between them and having mounted thereon the bearings 37 and 38 for a pair of downwardly projecting shafts 39 and 40 which, at their lower ends, have mounted thereon the belt wheels 41 and 42. Vertical belts 43 and 44 are associated with the pulleys 34—42 and 32—41, respectively, and are adapted to be so moved by the motor 27 that the outer reaches or sections of the vertical belts move in the same general direction as the horizontal belt 15, but, by virtue of the gearing 29—30, at a greater rate of linear speed than the belt 15. Due to the diagonal disposition of the vertical belts, however, the component of speed of these belts in the direction of movement of the belt 15, is rendered substantially the same as the speed of belt 15. This is a preferable speed relation.

The frame 10, at opposite points adjacent its right-hand end, as seen in Fig. 2, is provided with lower and upper bearings 45 and 46, respectively, for mounting a pair of vertical shafts 47—48. Intermediate the ends of these shafts, the latter carry guides or guide wheels 49 and 50. The upper ends of the shafts 47 and 48 are provided with pulleys 51 which are connected, by suitable belting 52, with cooperating pulleys 53 adjacent the upper ends of the shafts 39 and 40. By this means it will be seen that the motor 27, which operates the belts 43 and 44, also rotates the said guides or guide wheels 49 and 50. The speed of the guides 49 and 50 is set at a rate less than that of the vertical belts 43 and 44. This may be achieved by employing a selected size ratio between the pulleys 51 and 53.

The direction of movement of the various parts above mentioned may be ascertained by the arrows shown in connection therewith.

The wheels or guides 49 and 50 are so positioned with relation to the adjacent sections of the vertical belts 43 and 44 that they form therewith a pair of guideways adapted to pass cans therethrough, in one-by-one formation only, as will be further described.

The operation of depositing a plurality of objects or cans on the mechanism just described and having the cans arranged in single files, may now be set forth.

The cans are, as indicated at 54 in Fig. 1, deposited in unarranged condition, on the slow belt 16, and are carried thereby to the plate 19, commonly known as a dead plate. After a number of the cans have become concentrated on the plate 19, the cans farthest forward are pushed off the plate by the pressure of cans in the rear and are thus removed by the belt 15, which, by virtue of its greater rate of speed, serves to somewhat space the cans as taken from the plate 19. The cans are carried forward by the belt 15 and contact some portion either of the belts 43 or 44 or of the guide wheels 49 and 50. In any case, the cans are received singly into the guideway provided by the vertical belts and their associated wheels 49 and 50. The peculiar relative movements between the guides 49 and 50 and the vertical belts and the fact that the can-contacting portions of these members all have motion in the same general direction, preclude all possibility of the cans becoming wedged or jammed between the guide ways mentioned. Moreover, should a can, as seen adjacent the upper right hand side of Fig. 1, arrive at the guideway in a tilted position, the swifter movement of the belt 43 will at once straighten the can for movement through the guideway and in alignment therewith.

It may here be noted that the guides 49 and 50 are disposed in opposed relation with yieldable portions of the vertical belts 44 and 43, respectively, to preclude binding or wedging of cans between these parts which would be possible if the cans were passed through relatively unyielding guideways. This relationship, together with the differential speed ratio between the several parts acting upon the cans, results in the passage of the cans through the guideway in one by one formation only.

It is desirable for efficiently terminating the can handling operations heretofore described, to place all the cans in upright position so that they may be immediately transferred to storage, boxes or packages, or similar operations wherein it is essential that the cans be positioned in a uniform relationship.

For this purpose the present invention provides a mechanism for receiving the line of cans as transmitted by the structure heretofore described and for disposing on end, such of the cans as arrive in a horizontal position, that is, lying on their sides. This additional mechanism may comprise, as seen particularly in Figs. 3 and 4, pairs of spaced rails 55 and 56, one pair disposed on each side of the belt 15 and projecting forwardly thereof. As seen in Figs. 1 and 2, the inner ends of the rails 55 and 56 are disposed at the outlet of the cans from the guideways formed by the vertical belts 43 and 44 and their cooperating wheels 50 and 49. The said rails may be continued for a distance to form a horizontal runway, the outer end portions of which, as indicated clearly in Fig. 3 at 57, proceed downwardly at substantially a right angle. The lower edges of the rails 55 and 56 may be provided, as seen in Fig. 1, with inwardly projecting flanges 58 and between these, at the base of the runway so formed, is a moving cable 59 running upon suitable pulleys 60, Fig. 4. The cable 59, as seen especially in Fig. 3, may be conveniently operated from the roller 11 upon which the belt 15 runs. For this purpose, the ends of the roller 11 may be grooved for receiving the cable 59. The cable 59 may be carried over additional pulleys 61 and 62, the former being associated with the downwardly curved portion 57 of the rails 55 and 56. After being carried in reverse over the pulley 62 the cable 59 may proceed forwardly over a smaller wheel 63 and then, in its lower reach, rearwardly over the wheel 64, whence the cable is carried to the roller 11.

The cans are directed off the belt 15 onto the runway just described and are carried therein by the cable 59 to the downwardly projecting portion 57 which, in effect, forms a chute. In order to hold the cans properly in this chute portion, a shield or elongated curved plate 65, Figs. 3 and 4 is provided. Adjacent the upper end of plate 65 a transverse bar 66, extending across the runway, provides a bumper which, as indicated in Fig. 3, is adapted to be contacted by the upright cans of the advancing line whereby such cans are disposed in horizontal position for reception into the chute or closed portions of the runway. Dotted lines in Fig. 3 indicate the progress of cans through the runway.

It will further be seen that the cans are adapted to drop, at the bottom of the runway, onto the cable 59, the upper reach of which cable is moving in the direction of the arrow, Fig. 3. In order to prevent the upright cans at the bottom of the chute from being overturned by the cable 59, the present invention provides for a spring stop 67, Fig. 3 which may be hingedly connected, as at 68, to the lower end of the plate 65, where the spring stop projects resiliently into the can runway, so as to be contacted by each can as the latter descends to the cable 59. The spring stop is pressed outwardly by the can until the latter has reached the bottom of the chute, at which time the spring stop snaps inwardly contacting the edge portion of the top of the can to prevent the latter from tilting backwardly due to sudden actuation by the cable at the bottom. From this point the cans proceed outwardly and are removed, at a point adjacent the pulley 63, to the desired receptacle or location. It will be noted that the can runway is continued, as indicated at 69, Fig. 3, outwardly from the bottom of the chute to any desired point.

Reverting to Fig. 2: A plate or guard 70 may be supported upon the frame 10 above the belt 15 being of substantially the same width as the belt 15 and extending from the dead plate 19 forwardly to the right end of the mechanism, over the cooperating moving elements operating upon the cans. The guard 70 is made vertically adjustable by suitable means (not shown) and is positioned, during use, a slight distance above the tops of the upright cans, being adapted to preclude such cans from being knocked down by movement of the belt 15 or the other moving belts. The guard or plate 70 is omitted in Fig. 1 for the sake of clarity. It will be noted that lateral guard rails 71 and 72 (Figs. 1 and 2) may be provided along each side of the horizontal belts 15 and 16 and the dead plate 19, the guard rails being supported by suitable uprights 73.

A further refinement may be noted: The motor driving the vertical belts 43 and 44 may have associated therewith a time delay relay (not shown) by virtue of which the motor 27 for the vertical belts operates for a brief period longer than the main motor 20 since, due to the weight of the belt 15 and its associated rollers and parts, the large belt continues to move for a brief interval by inertia after the motor 20 has been shut off. It is this after-interval which the time delay relay associated with the smaller motor 27 is intended to compensate for. If such means were not provided, the extra movement of the belt 15 would result in the accumulation of cans in the guideway portions associated therewith.

What is claimed is:

1. Apparatus for transferring and arranging a plurality of articles, said apparatus comprising a carrier moving in one direction and adapted to have the articles deposited unarranged thereon, a belt mounted adjacent the carrier for movement in the same general direction as the carrier and positioned substantially upright relative thereto, and a guide wheel mounted adjacent the carrier in opposed relation with said belt and having its periphery adjacent said belt rotating in the same general direction as and at a slower peripheral speed than said belt, said belt and wheel forming a guideway providing for passage therethrough, in one-by-one formation only, of articles carried by the carrier.

2. Apparatus for transferring and arranging a plurality of articles, said apparatus comprising a horizontal moving belt adapted to have the articles deposited unarranged thereon, a vertical belt mounted above the horizontal belt and moving in the same general direction as the horizontal belt, and a guide wheel mounted above the horizontal belt and rotating on an upright axis and at a peripheral speed slower than that of the vertical belt, said wheel forming with said vertical belt a guideway transmitting the cans in single line formation.

3. Apparatus for transferring and arranging a plurality of articles, said apparatus comprising a slow-moving belt adapted to have the articles dumped thereon, a fast belt associated with the slow belt for receiving the articles therefrom and for advancing and spacing the articles, a vertical belt mounted above said fast belt and moving in the same general direction as the fast belt, and a rotary guide mounted above the fast belt for rotation at a slower peripheral speed than the vertical belt, the rotary guide in that portion thereof adjacent the vertical belt moving in the same general direction as said belt, the rotary guide and vertical belt forming between them a guideway receiving and transmitting the cans in single line formation.

FREDERICK C. MARX.